United States Patent [19]
Manjikian

[11] 3,769,128
[45] Oct. 30, 1973

[54] METHOD OF PRODUCING SEMIPERMEABLE MEMBRANE ELEMENTS
[75] Inventor: Serop Manjikian, Del Mar, Calif.
[73] Assignee: Universal Water Corporation, Del Mar, Calif.
[22] Filed: May 5, 1971
[21] Appl. No.: 140,583

Related U.S. Application Data
[63] Continuation-in-part of Ser. No. 818,514, April 23, 1969, Pat. No. 3,578,175.

[52] U.S. Cl............... 156/185, 156/191, 156/195, 210/321, 210/496, 210/497.1, 210/506
[51] Int. Cl............................................. B01d 29/42
[58] Field of Search................. 156/185, 195, 187, 156/188; 210/321, 489, 490, 23, 491, 500, 497 H, 497, 497.1, 510; 264/49

[56] References Cited
UNITED STATES PATENTS
| 3,432,585 | 3/1969 | Watson et al. | 264/49 X |
| 3,042,216 | 7/1962 | Goldman | 210/489 X |
| 3,063,888 | 11/1962 | Howard et al. | 156/187 |
| 3,213,016 | 10/1965 | Gowers et al. | 210/500 X |
| 3,494,470 | 2/1970 | Banfield | 210/321 |
| 2,987,472 | 6/1961 | Kollsman | 210/23 |
| 3,519,560 | 7/1970 | Tatlor | 210/489 X |

OTHER PUBLICATIONS
U.S. Dept. of Inter. Office of Saline Water R&D Progress Report No. 86; "Design & Constr. of Desal. Pilot Plant" (A Reverse Osmosis Process), Aero Jet – Gen. Corp., PB 181574, Office of Tech. Serv., Wash, D.C.

Primary Examiner—Alfred L. Leavitt
Assistant Examiner—David A. Simmons
Attorney—Clement H. Allen

[57] ABSTRACT

A membrane element for use in a reverse osmosis apparatus is produced by helically winding slightly wet or moist semipermeable membrane strip around the outside of a porous support structure. The contiguous turn edges of the semipermeable membrane strip are preferably overlapped and are sealed by interposition of autogenous bonding agent between overlapped surfaces or by application of pressure sensitive adhesive tape. A fabric layer, preferably double, may be wound under the membrane. The wound element may be heat treated to improve selectivity of the membrane and to set the bonding agent or adhesive.

4 Claims, No Drawings

METHOD OF PRODUCING SEMIPERMEABLE MEMBRANE ELEMENTS

This application is a continuation-in-part of my copending application Ser. No. 818,514 filed Apr. 23, 1969 now U.S. Pat. No. 3,578,175.

This invention relates to production of a membrane element particularly useful in apparatus for treatment of liquids by reverse osmosis.

Reverse osmosis is accomplished by applying a solution to be purified under pressure to one side of a semipermeable membrane which permits the passage of water or solvent but prevents the passage of salts or dissolved solids. The original solution will be correspondingly concentrated and is usually discarded as brine when the purified liquid is the desired product. However, the process is also applicable to treatment of many solutions such as foods, beverages and by-products in which the concentrate is the desired product and the liquid passing through the membrane may be discarded, or considered secondary.

Several types of membrane support arrangements are employed in reverse osmosis modules. One type employs flat membrane sheets supported on porous plates or grids, a number of such plates being stacked into a plate and frame assembly. Another type of module employs sheet-like porous elements interleaved with a semipermeable membrane sheet, the combination being rolled into a spiral pack. Feed solution is introduced into one end of the pack while brine is discharged from the other end and product water is collected from the porous element facing the membrane. Yet another type of module employs porous wall, pressure-resistant tubes with semipermeable membrane tubes on their inner surfaces. Still another type employs membrane tubes in the form of very fine, hollow fibers. An improved type of module is one which employs support structures enclosed in a pressure container and having semipermeable membranes on their outer surfaces, particularly helically wound membrane elements as described and claimed in my copending Patent application Ser. No. 818,514 filed Apr. 23, 1969 now U.S. Pat. No. 3,578,175 and which are used in the module of my application Ser. No. 39,104 filed May 20, 1970 now U.S. Pat. No. 3,616,929. Such helically wound membrane elements are efficient in operation, and are easy to clean and replace when necessary since the membrane surface is on the outside of its support structure.

The production of such helically wound membrane elements is not simple since care must be taken to insure that fabrication procedures do not impair the operating efficiency of the system. It is particularly important that the operating characteristics of the membrane be preserved at the highest possible level, and that joining and sealing of the membrane strip edges and ends be strong, permanent and tight so that no separation or leakage can occur, even under high operating pressure.

It has been recognized that many semipermeable membrane materials, particularly cellulose acetate, possess and retain superior operating properties, e.g., flux and selectivity, if they are produced as wet membranes and stored wet, as by immersion in water, before fabrication into elements. Fabrication into shape and configuration suitable for use in the system is carried out while the membrane is maintained wet or at least moist, and it must be kept in at least moist condition until use. The membrane, in short, must not be allowed to dry out at any time after it is first formed.

So-called "dry" membranes have been produced and used commercially but these have not been completely satisfactory. They have not always been completely dry in that absorbed water is still present in the membrane structure. Their operating efficiency has not proved to be as good as membranes that have been produced and maintained wet. And when immersed in water at the time of or prior to use, the "dry" membrane often suffers dimensional deformation which results in folds and wrinkles that seriously affect its usefulness in many instances.

Therefore, use of wet membranes in membrane elements will result in highest osmotic efficiency, but joining and sealing edges of wet semipermeable membrane strips helically wound around permeable cores has proved difficult because of the presence of water which seriously interferes with the joining and sealing ability of many adhesives.

Summarized briefly this invention provides a method for producing a membrane element having an outer semipermeable membrane surface which will retain the excellent operating characteristics of a wet membrane but will be as readily fabricated and as tightly joined and sealed as would be a so-called "dry" membrane. This is accomplished by helically winding a semipermeable membrane strip around a permeable core while the membrane strip is wet and sealing contiguous edges of the wound membrane strip with a water soluble composition which will dissolve the surface of the semipermeable membrane strip and set to form an autogenous weld. In another modification the contiguous edges of the membrane strip turns are joined and sealed by winding a pressure sensitive adhesive tape over the edges under tension. The ends of the membrane windings are sealed to surfaces of the permeable core by a wrapping of pressure sensitive adhesive tape also applied with the tape under tension. The membrane is maintained wet or at least moist during these operations.

The term "wet" as used herein, as applied to the condition of the semipermeable membrane strip, is intended to denote soaked, covered or drenched with water. The term "moist" is intended to denote moderately or slightly wet or damp, but for the purposes of this invention, not having appreciable or excess water, for example, as drops or droplets on its surface.

If the semipermeable strip has been stored immersed in water or in a high humidity atmosphere which may be as high as 100 percent humidity, as is convenient and effective for preservation of its characteristics, excess surface water is preferably removed by wiping or sponging off the surface with suitably soft material or by passing the strip over a roller or equivalent device that will mechanically remove large drops or droplets of water but will still leave the strip in wet or moist condition.

The moist semipermeable strip is then helically wound around a permeable core while being maintained moist and not allowed to dry out. This may be accomplished by winding under sufficiently humid conditions or with suitable speed so that deleterious loss of moisture does not occur. The contiguous edges of adjacent turns of semipermeable membrane strip so wound are preferably overlapped and this overlap may be sealed by interposition therebetween during winding of a bonding agent which will dissolve adjacent membrane surfaces and set to join them together to form an autogenous weld. Such a solution may comprise a mixture of triacetin and 1-propanol, preferably also containing a small amount of cellulose acetate, which will be particularly effective when used with cellulose acetate membranes. Improved results will be obtained by maintaining the semipermeable membrane strip free from excess water but not dry so that its reverse osmosis properties are affected. Excess water will impede the solvent action and the quick setting time which is important for tight sealing and strong bonding.

An alternative method of carrying out this specific step is to use a pressure sensitive adhesive tape applied under tension to join and seal edges of the semipermeable membrane turns. The tape may be of suitable plastic material such as MYLAR of convenient thickness and have a surface coating of suitable pressure sensitive adhesive. Various commercially available tapes may be used exemplified by Permacel Corp. No. EE-6397, 3 mil, KAPTON tape. Applying the tape to the edge joint by winding under tension accomplishes two things which are of considerable importance. First, application of the tape winding under tension tends to squeeze out residual surface water to promote contact between the adhesive and the membrane surface; and, second, tension application applies pressure on the adhesive to effectively promote development of its adhesive properties. Thus a commercially available adhesive tape can be effectively used under these normally very difficult conditions, the combination of the membrane which is moist but not too wet, and tension application being responsible for successful bonding and tight sealing.

The ends of the semipermeable membrane winding are also sealed to permeable core surfaces by application under tension of pressure sensitive adhesive tape to form a wrapping covering the membrane ends and on adjacent core surfaces. A bonding agent producing an autogenous weld cannot ordinarily be used in this instance because the membrane and core materials of construction will ordinarily be different while sealing edges of the membrane together as previously described involves joining two surfaces of the same body having identical compositions. The tape wrapping does, however, make a perfectly satisfactory seal applied under the conditions described.

The bonding and sealing action of the pressure sensitive tape can be enhanced by immersing the wrapped membrane element in a water bath at elevated temperature. This heat treating or curing step can be arranged to accomplish a dual purpose, since the semipermeable membrane itself often needs heat treatment to develop optimum selectivity. Immersion of the wrapped membrane element for a period of from about 5 minutes to 1 hour, in water maintained at between 65° and 95°C, for example, when employing a cellulose acetate membrane, will heat treat the membrane and also heat set the adhesive tape.

The precise amount of tension to be used with tape winding both for membrane turn sealing and end sealing will vary according to conditions. Normally it should be great enough to produce good bonding contact but not so great as to distort the tube, deform the membrane, or break the tape. A tension of between one-half to about 10 pounds using the width and type of tape described will generally be adequate.

It is often desirable to produce the membrane elements on a core which is formed of a tube of compression resistant material such as high strength plastic drilled at intervals to provide porosity. Under these conditions a layer of porous material such as nylon cloth or filter paper is wound around the tube under the membrane winding to provide lateral flow to the perforations in the tube and to provide support for the membrane to bridge over the perforations without deleterious deformation. It has been found preferable to use two layers of porous material under the membrane particularly if cloth is employed since this seems to provide better lateral flow. An advantageous method of applying such porous material is to helically wind a strip around the core each turn overlapping one half the width of the preceding turn. By this procedure a double layer of porous material is produced from a single winding operation using a single double width strip. Another advantage of this procedure is that the back edge of each turn can be wound to abut the riser (that is the vertical part of the step) formed where the previous turn follows down over the leading edge of the turn before it. Thus ridges formed by overlapping turn edges are eliminated.

When a wet or moist semipermeable membrane is employed, according to this invention, the porous material under the membrane winding will also absorb some moisture. This is very important since a moist underlayer will tend to stabilize the membrane moisture content and help to prevent any deleterious moisture loss.

The following examples illustrate the practice of selected embodiments of this invention.

EXAMPLE 1

A 3-foot length of high strength plastic tubing of 7/16-inch outside diameter and 3/16-inch inside diameter was drilled with 1/32-inch holes at one inch intervals to provide porosity. The drilled tube was chucked in a lathe-like machine which rotated the tube and advanced it by a station having reels of nylon cloth strip and semipermeable membrane strip at a speed to produce a helical winding of these strips around the tube. The nylon cloth strip was two inches wide and the membrane strip was 1 1/16-inch wide.

A cellulose diacetate semipermeable membrane strip was placed on its reel and was maintained wet by immersion in water. As it was led to the rotating core tube it passed over a roller which removed a substantial amount of excess water, at the same time the membrane was still maintained moist.

The nylon cloth strip end was attached to the support tube and given a holding turn, then the semipermeable membrane strip end was attached. The wind angle and position of the nylon cloth reel was set to produce an overlap one-half the width of the strip, to form a double layer of cloth. The wind angle and position of the membrane reel was set to produce a 1/16-inch overlap of the turns with a pressure glue gun arranged to feed a continuous stripe of a solution of 80 percent triacetin, 17 percent 1-propanol and 3 percent cellulose diacetate between the overlapping membrane surfaces.

The support tube was then rotated and advanced past the reels to produce a double nylon cloth layer and a superimposed single semipermeable membrane layer simultaneously helically wound over its surface. After winding, surplus cloth and membrane were trimmed and the retained ends were sealed to the support tube surface using wrappings of PERMACEL EE-6379 3 mil, pressure sensitive adhesive tape applied by hand using about 3 pounds tension. It was immersed in water at a temperature of 82° C for a period of 10 minutes to heat treat the semipermeable membrane and to assist in setting the adhesive.

The bonding agent set very quickly so that the helically wound membrane element could be immersed in water substantially immediately after winding to prevent dehydration and loss of membrane properties.

EXAMPLE 2

Production of the membrane element was similar to that described in Example 1 except that no bonding agent was applied between overlapped surfaces of the semipermeable membrane strip. Instead the overlapped edge of each turn was sealed to the surface of the preceding turn by an overlaid strip of PERMACEL EE-6379 3 mil KAPTON tape, one-eighth inch wide, applied under tension of about 3 pounds.

Membrane elements produced according to Example 1 and 2 were tested for operating properties in a reverse osmosis test loop using feed water containing 1,300 ppm total dissolved solids at 450 psig. The flux through the membrane was 12–15 gallons per square foot per day and selectivity was 95–98 percent. Extended life tests over several months duration showed satisfactory bonding and sealing of both the autogenous welded membrane overlaps and the overlaps sealed with tape windings.

I claim:

1. A method for producing a membrane element adapted for use in apparatus for treatment of a liquid by reverse osmosis comprising:
   a. winding a single layer of semipermeable membrane strip helically around a permeable core;
   b. sealing together the contiguous edges of said helically wound semipermeable membrane strip by wrapping the joint of said edges with a pressure sensitive adhesive tape while maintaining said tape under tension; and
   c. sealing the ends of said helically wound semipermeable membrane strip to surface of said permeable core in which the improvements comprise
   1. maintaining said semi-permeable membrane strip at least moist during step (a), step (b), and step (c).

2. A method for producing a membrane element adapted for use in apparatus for treatment of a liquid by reverse osmosis comprising:
   a. winding a single layer of semipermeable membrane strip helically around a permeable core;
   b. sealing together the contiguous edges of said helically wound membrane strip; and,
   c. sealing the ends of said helically wound strip to surface of said permeable core by wrapping with pressure sensitive adhesive tape applied under tension in which the improvements comprise
   1. maintaining said semi-permeable membrane strip at least moist during step (a), step (b), and step (c).

3. A method for producing a membrane element adapted for use in apparatus for treatment of a liquid by reverse osmosis comprising:
   a. winding a single layer of semipermeable membrane strip helically around a permeable core with contiguous edges over-lapping;
   b. sealing together the said overlapping contiguous edges of said helically wound semipermeable membrane strip by applying therebetween during winding a sealing agent capable of dissolving surfaces of said semipermeable membrane strip and forming an autogenous bond; and,
   c. sealing the ends of said helically wound membrane strip to surfaces of said permeable core in which the improvements comprise
   1. maintaining said semi-permeable membrane strip at least moist during step (a), step (b), and step (c).

4. A method according to claim 3 in which said sealing agent comprises a mixture of triacetin and 1-propanol.

* * * * *